May 5, 1953     A. A. SCHMITZ     2,637,263
TWO-ROW IMPLEMENT

Filed Nov. 7, 1947     2 SHEETS—SHEET 1

INVENTOR
ALBERT A. SCHMITZ
BY
ATTORNEYS

May 5, 1953

A. A. SCHMITZ 2,637,263

TWO-ROW IMPLEMENT

Filed Nov. 7, 1947

INVENTOR
ALBERT A. SCHMITZ

BY

ATTORNEYS

Patented May 5, 1953

2,637,263

UNITED STATES PATENT OFFICE 2,637,263

TWO-ROW IMPLEMENT

Albert A. Schmitz, Racine, Wis.

Application November 7, 1947, Serial No. 784,599

3 Claims. (Cl. 97—233)

This invention appertains to agricultural machines and more particularly to a novel transplanter.

One of the primary objects of my invention is to provide a double row transplanter so arranged and constructed that the operators planting in one row will not interfere with the operators planting in the adjacent row, whereby an efficient machine will be had.

Another salient object of my invention is to provide a double row transplanter in which the planting units are offset, so that the operators of one unit will be in rear and at one side of the operators of the other unit, so that the operators of the two units will have free use of their hands without interfering with one another.

A further object of my invention is to provide a double row transplanter having a novel offset main axle carrying the ground wheels, whereby the desired location of the units relative to one another can be obtained.

With these and other objects, the invention consists in the novel construction, arrangement, and formation of parts, as will be hereinafter more specifically described and claimed, and illustrated in the accompanying drawing, in which drawing:

Referring to the drawings in detail, wherein similar reference characters designate corresponding parts throughout several views the letter T generally indicates my novel double row transplanter.

Figure 1:
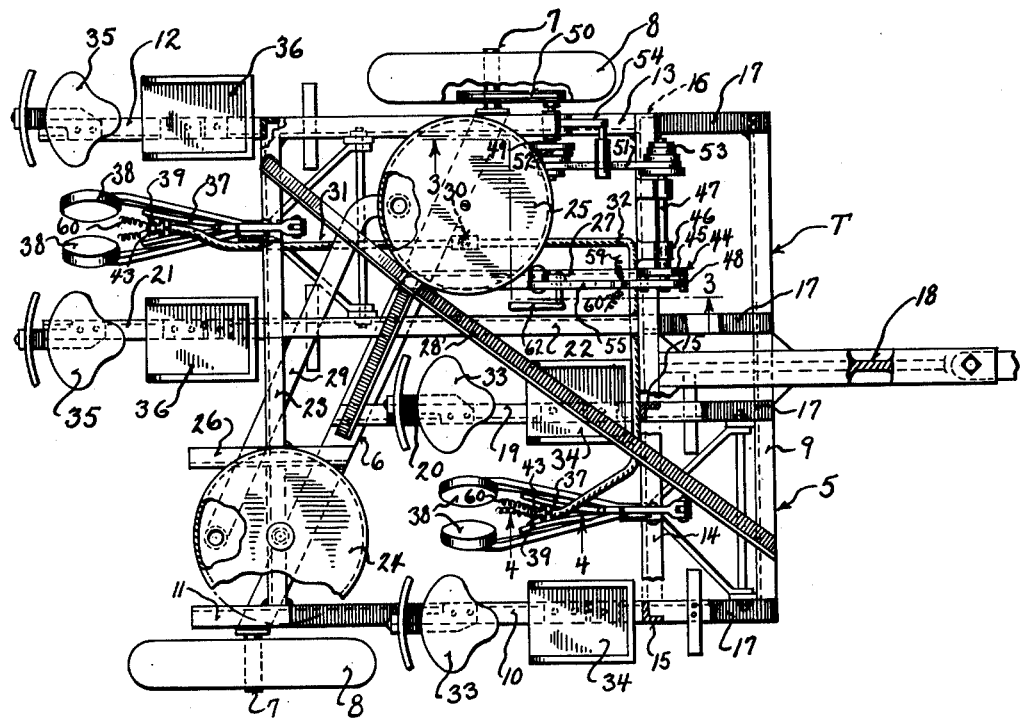
Figure 1 is a top plan view of my improved double row transplanter, parts of the view being shown broken away and in section to illustrate structural and detail.
Figure 2:
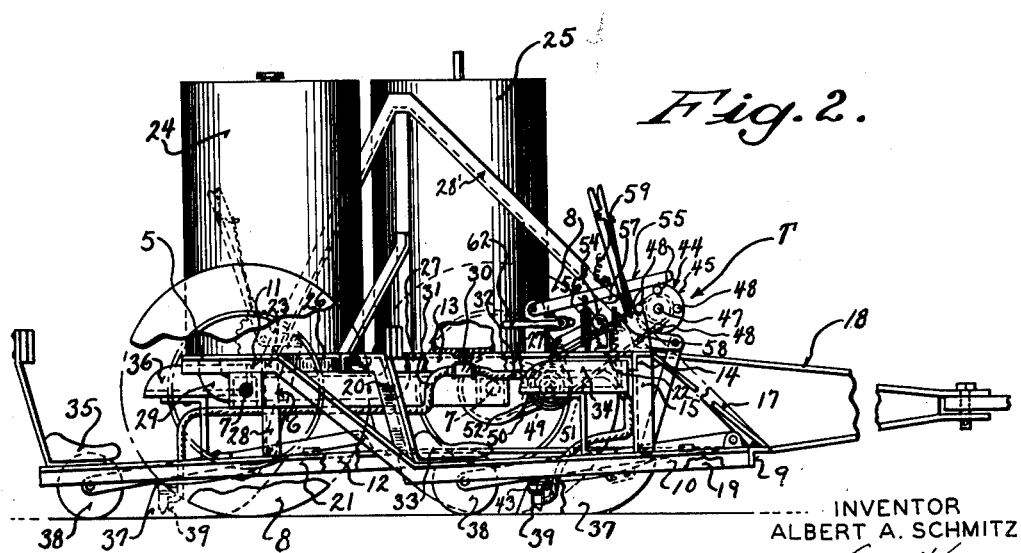
Figure 2 is a side elevational view of the double row transplanter, parts of the view being shown broken away and in section.

The transplanter T includes a frame 5, the essential part of which comprises the offset axle beam 6. This axle beam 6 extends diagonally across the frame and has secured to its ends stub axles 7. Main ground wheels 8 are rotatably mounted on the stub axles. Hence one ground wheel 8 is in advance of the other and is out of transverse alignment with said other wheel. The frame itself is mounted upon this axle and can be fabricated out of any desired material and assembled in the most advantageous manner suitable to the manufacture.

As illustrated, the frame includes a front transversely extending beam 9 to which is secured at one end, the longitudinally extending side beam 10. This side beam 10 extends downwardly and rearwardly from the front beam 9 and then extends upwardly and rearwardly toward the axle beam 6. This side beam then terminates in a straight position 11 which is rigidly secured to the axle beam 6. On the opposite side of the frame is an extended side beam 12, which is secured at its forward end to the front beam 9. This beam extends rearwardly and downwardly at an angle below and beyond the axle beam 6. Arranged above the side beam 12 is a top side beam 13. This beam 13 extends over and is rigidly secured to the axle beam 6 and continues rearwardly beyond said axle beam.

In order to effectively brace the frame structure, an upper transversely extended front beam 14 is provided and this beam is arranged above and in rear of the front main beam 9. Uprights 15 and 16 are employed for connecting the beam 14 with the side beams 10 and 12. Forwardly extending brace straps 17 are employed for connecting the beam 14 and the beam 9. A hitch tongue 18 is secured to the front beam 9 and the beam 14 so that the transplanter can be connected to a tractor or the like. An intermediate longitudinally extending beam 19 is also provided and this beam corresponds to the beam 10 and is arranged in spaced parallel relation to and in the same horizontal plane with the beam 10. The beam 19 is secured at its forward end to the front beam 9 and has its rear end inclined upwardly and rearwardly, as at 20, to the main axle 6 and this beam is rigidly secured to said axle. The beams 10 and 19 in effect form the frame for one unit of the transplanter, as will be later set forth.

An intermediate beam 22 is also provided for the frame and this beam 22 corresponds identically with the top beam 13 and is arranged in spaced parallel relation thereto and has its forward end secured to the top front beam 14. The beams 13 and 22 have their rear ends secured to a rear top frame beam 23 which corresponds to the top frame beam 14 and is arranged in spaced parallel relation thereto. This beam 23 extends over the axle beam 6 and is rigidly secured thereto and to the rear end of the main side beam 10.

In order that an adequate supply of water will be had for the transplanter, I provide a pair of spaced water tanks 24 and 25. The tanks are offset one from the other and are arranged on the opposite sides of the longitudinal center of the planter. Consequently the weight of the tanks and the water therein will be balanced on the frame. The tank 24 is rigidly secured to the frame beam 10 and the top rear frame beam 23 and I can provide an additional frame beam support 26 for this tank which is secured to the axle beam 6 and said frame beam 23. The tank 25 is rigidly secured to the frame beam 13 and to a short supporting beam 27 which is secured at its rear end to the axle beam 6 and at its forward end to the front top frame beam 14. The frame can be braced in any other desired way such as by brackets 28 which connect the beams 12 and 21 adjacent their rear ends with beam 23. These brackets 28 are important, in that they help to support the weight of the operators. Likewise additional supports can be provided for the water tanks where needed. Attention is also directed to the diagonally extending truss beam structure 28'. This structure braces the frame and prevents twisting thereby and helps to support and distribute the weight of the operators on the seats 33 and 35.

As heretofore intimated, the frame T can be constructed best suited for the manufacture, but stress is laid on the position of the axle beam 6, the beams 10 and 19 and the beams 12 and 21. Attention is directed to the fact that the beams 12 and 21 are arranged at one side of the beams 10 and 19 and extend a considerable distance in rear of the beams 10 and 19.

The water tanks 24 and 25 are connected at their lower ends by a pipe 29 so that the level of the water in the tanks will be maintained equally therein at all times. One of the tanks, namely the tank 25, has connected to its lower end an outlet T coupling 30 and this coupling has in turn secured thereto flexible water conducting pipes 31 and 32. Pipe 31 is employed for one unit of the transplanter and the pipe 32 is employed for the other unit of the transplanter, as will be later more fully set forth.

Seats 33 are rigidly secured to beams 10 and 19 for the operators of one unit and arranged forwardly of the seats are receptacles for the plants to be set in the ground. As illustrated these receptacles are in the nature of boxes 34 which are rigidly secured to the beams 10 and 19.

Seats 35 are provided for the operators of the other unit of the transplanter and these seats are rigidly secured to the beams 12 and 21 and these beams have also secured thereto forwardly of the seats 35 boxes 36 for the plants to be set in the ground.

Each transplanter unit includes the usual furrow opener 37 and furrow packing and closing wheels 38. The furrow openers 37 and wheels 38 are mounted on an adjustable frame and, as this frame and the furrow openers and furrow closers form no part of the present invention and are common in transplanters now on the market, the same will not be described in detail.

Figure 4:
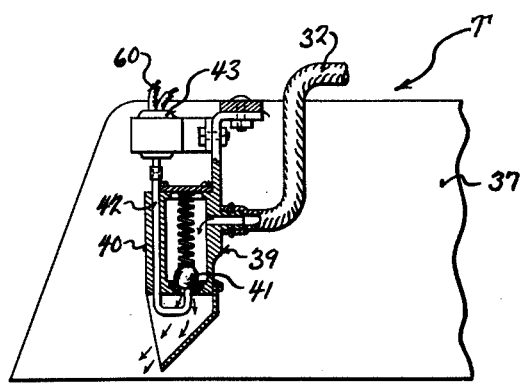
Figure 4 is an enlarged fragmentary detail vertical sectional view through one of the water valves, the section being taken on the line 4—4 of Figure 1 looking in the direction of the arrows.
Figure 4:
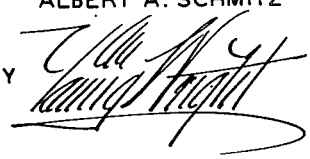

It is to be noted, however, that each furrow opener 37 has associated therewith a water distributing valve device 39 (see Figure 4).

Each of the valve structures 39 include a valve housing 40 and a spring pressed ball valve 41. In order to lift the ball valve off of its seat each valve housing slidably supports a valve rod 42. The lower end of each valve rod is of a U shape and has its terminal fitted under its valve, so that when the rod is raised the valve will be unseated. A solenoid 43 is provided for operating each valve rod 42 and the upper end of each valve rod carries the core for its solenoid. The water conducting pipe 31 leads to the valve housing for one unit and water conducting pipe 32 leads to valve housing for the other unit and when the valve rods are raised water will be supplied to the furrows.

Figure 3:
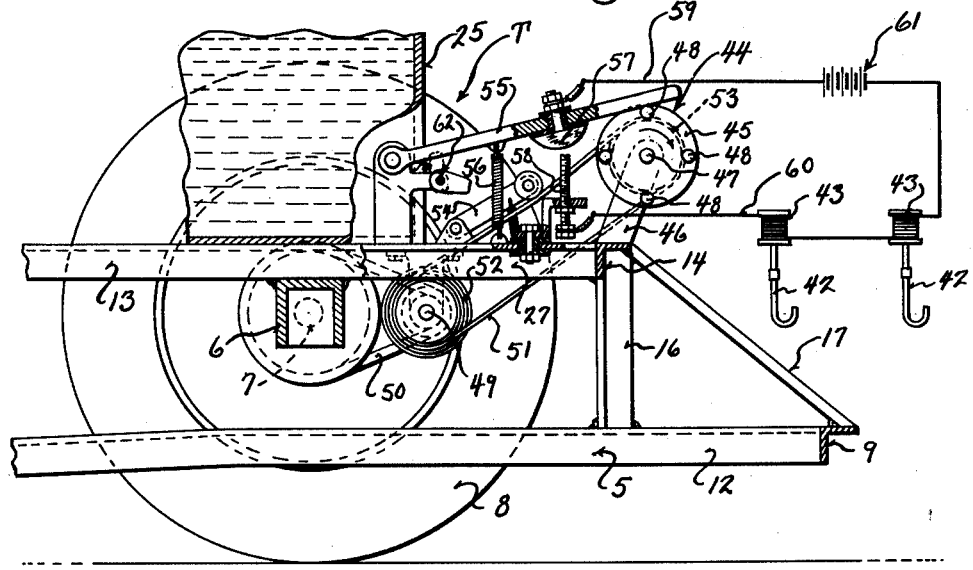
Figure 3 is an enlarged fragmentary detail vertical sectional view through the transplanter taken on the line 3—3 of Figure 1 looking in the direction of the arrows illustrating the novel circuit closer for the solenoids of the water valves, the circuit being shown diagrammatically.

Means is provided for simultaneously energizing the solenoids and for this purpose a circuit maker and breaker 44 is provided (see Figure 3). The circuit maker and breaker 44 includes a timing disk rotatably mounted on brackets 46 carried by the beam 14 adjacent to one ground wheel. As illustrated the brackets 46 are in the nature of bearings and support a shaft 47 to which is secured said timing disk. The disk carries the desired number of removable equi-distantly spaced laterally extending operating pins 48. The pins preferably carry rollers to diminish friction and wear. The shaft is driven at the desired speed from one of the ground wheels and in order to accomplish this, I provide a countershaft 49 rotatably carried by the beam 13. The countershaft is driven from one ground wheel by means of suitable pulleys and a pulley belt 50. The countershaft drives the timer shaft 47 by means of a pulley belt 51 which is moveable to selected pulley wheels 52 and 53 carried respectively by the countershaft 49 and the timer shaft 47. A belt tightener 54 can be provided for the belt 51, if such should be desired. Rockably mounted upon the beam 27 is a switch lever 55 and a contractile coil spring 56 can be employed for holding the lever down toward the timer pins or studs 48. The switch lever 55 carries a contact point 57 which is adapted to engage an adjustable contact point 58 carried by the beam 27 when the lever is in its lowermost position. The lever is raised against the tension of the spring 56 by the timer pins or studs and when the lever rides off one of the pins the same moves downwardly so that the contact 57 will engage the contact 58. Line wires 59 and 60 lead respectively to the contacts 57 and 58, and the wire 60 has electrically connected therein the solenoids 43. The wires 59 and 60 lead to a suitable source of electrical energy, such as the generator or batteries of the tractor. If desired, a battery can be carried directly by the transplanter. The battery is indicated by the reference character 61 in the drawings.

The pins 48 are removable, so that the spacing thereof can be changed, in order to give a desired range of plant spacing in the rows.

The contact point 58 is adjustable to providing a means of regulating the amount of water delivered to the furrow for each plant. The closer this point 58 is set to point 57 the longer will be the length of time that the circuit is closed and the valves open thus delivering more water. In order to hold the circuit maker and breaker against operation, say during the turning of the planter or traveling to and fro from fields, I can provide a manually actuated latch 62. This latch can be swung under the latch lever 55 so as to hold the latch lever in a raised position and out of engagement with the pins 48.

In the use of my double row transplanter, the water tanks are filled and the plants are placed in the boxes 34 and 36. The operators take their places in the customary manner and the planter is pulled down the rows. The planter functions in the usual manner and the operators take the plants from the boxes and place the same in the furrows as the same are opened by the furrow openers 37 and at the same time the valves 39 are open to supply water.

Due to the arrangement of the units relative to one another one set of operators will be at one side of and in rear of the other set of operators and consequently the operators will not interfere with one another. Stress is also placed on the electrical means employed for operating the water valves.

Changes in details may be made, but what I claim as new is:

1. In a two-row implement, a substantially rectangular frame having a pair of side members and parallel front and rear members, an axle beam connected to said side members and extending diagonally from the rear portion of one of said side members to a portion of the other side member intermediate said front and rear members, a pair of ground wheels carried on the ends of said axle beam in parallel relation to each other and to said side members, a pair of implements including seats for the operators of said implements carried by said frame on opposite sides of the longitudinal center line of said frame and closely adjacent said line, one of said implements being mounted within said frame ahead of the ground wheel adjacent the rear portion of said one side member, and the other of said implements being mounted on said frame behind said other ground wheel and extending rearwardly of said rear member, whereby the implements may work in closely spaced rows but the seats for the operators of the implements are spaced longitudinally so that the operators of one implement do not interfere with the operators of the other implement.

2. In an implement as described in claim 1, a seat for said one implement being mounted on said one side member, and a seat for the other implement being mounted on a rearward extension of the other side member.

3. In an implement as described in claim 2, said frame also having two longitudinal members disposed inwardly of said side members in parallel relation thereto and on opposite sides of said longitudinal center line, one of said longitudinal members being connected at its ends to said front member and axle beam and mounting a seat associated with said one implement, the other longitudinal member being connected to said front and rear members and having a rear end portion behind said rear member, and a seat associated with the other implement mounted on said rear end portion.

ALBERT A. SCHMITZ.

References Cited in the file of this patent

UNITED STATES PATENTS

| Number | Name | Date |
|---|---|---|
| 182,569 | Fagan | Sept. 26, 1876 |
| 529,492 | Hill et al. | Nov. 20, 1894 |
| 915,546 | Briddell | Mar. 16, 1909 |
| 1,475,061 | Frawley | Nov. 20, 1923 |
| 1,573,270 | Pearson | Feb. 16, 1926 |
| 1,807,474 | England | May 26, 1931 |
| 1,886,457 | Winkley | Nov. 8, 1932 |
| 2,534,798 | Schneider | Dec. 19, 1950 |